US011062848B2

(12) United States Patent
Nakamoto

(10) Patent No.: US 11,062,848 B2
(45) Date of Patent: Jul. 13, 2021

(54) MULTILAYER CERAMIC ELECTRONIC COMPONENT

(71) Applicant: Murata Manufacturing Co., Ltd., Nagaokakyo (JP)

(72) Inventor: Atsushi Nakamoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 20 days.

(21) Appl. No.: 16/691,665

(22) Filed: Nov. 22, 2019

(65) Prior Publication Data

US 2020/0168400 A1 May 28, 2020

(30) Foreign Application Priority Data

Nov. 27, 2018 (JP) .............................. JP2018-221265

(51) Int. Cl.
| | |
|---|---|
| *H01G 4/012* | (2006.01) |
| *H01G 4/232* | (2006.01) |
| *H01G 4/30* | (2006.01) |
| H01G 4/008 | (2006.01) |
| H01G 4/12 | (2006.01) |

(52) U.S. Cl.
CPC ............ *H01G 4/2325* (2013.01); *H01G 4/012* (2013.01); *H01G 4/30* (2013.01); *H01G 4/008* (2013.01); *H01G 4/1227* (2013.01); *H01G 4/1236* (2013.01)

(58) Field of Classification Search
CPC ........ H01G 4/012; H01G 4/2325; H01G 4/30; H01G 4/008; H01G 4/1227; H01G 4/1236; H01G 4/232; H01G 4/20; H01G 4/005

USPC .......... 361/306.3, 321.2, 301.4, 321.5, 321.4; 174/260

See application file for complete search history.

(56) References Cited

U.S. PATENT DOCUMENTS

| | | | | |
|---|---|---|---|---|
| 2008/0073108 | A1* | 3/2008 | Saito ...................... | H01G 4/005 |
| | | | | 174/256 |
| 2014/0043724 | A1* | 2/2014 | Kang ................... | H01G 4/2325 |
| | | | | 361/321.2 |
| 2020/0168396 | A1* | 5/2020 | Nakamoto ............. | H01G 4/232 |

FOREIGN PATENT DOCUMENTS

JP      11-162771 A    6/1999

* cited by examiner

*Primary Examiner* — Timothy J Thompson
*Assistant Examiner* — Guillermo J Egoavil
(74) *Attorney, Agent, or Firm* — Keating & Bennett, LLP

(57) ABSTRACT

A multilayer ceramic electronic component includes a rectangular parallelepiped laminate body. An external electrode is provided at both end surfaces of the laminate body. The external electrode includes a base electrode layer, a conductive resin layer on the base electrode layer, and a plating layer on the conductive resin layer. The conductive resin layer includes a first layer on the base electrode layer, a second layer on the first layer, and a third layer on the second layer. With respect to porosity which is an area ratio of pores obtained from a binary image within a predetermined field of view, the first layer and the third layer have a porosity of equal to or less than about 5% and the second layer has a porosity equal to or more than about 6%. Thicknesses of the first, second, and third layers satisfy predetermined conditions.

18 Claims, 5 Drawing Sheets

MULTILAYER CERAMIC ELECTRONIC COMPONENT

CROSS REFERENCE TO RELATED APPLICATIONS

This application claims the benefit of priority to Japanese Patent Application No. 2018-221265 filed on Nov. 27, 2018. The entire contents of this application are hereby incorporated herein by reference.

BACKGROUND OF THE INVENTION

1. Field of the Invention

The present invention relates to a multilayer ceramic electronic component.

2. Description of the Related Art

Recently, a ceramic electronic component represented by a multilayer ceramic capacitor has been used under a more severe environment compared to conventional ceramic electronic components.

For example, an electronic component used for a mobile device such as a mobile phone and a portable music player has been requested to endure an impact which the electronic component receives when the mobile device falls. Specifically, it is necessary to prevent the removal of an electronic component from a printed circuit board or to prevent the occurrence of cracks in the electronic component even when the mobile device receives an impact by falling.

Further, an electronic component used for vehicle-mounted equipment such as an electronic control unit (ECU) has been requested to endure an impact caused by a heat cycle. Specifically, it is necessary to prevent the occurrence of cracks in a ceramic electronic component even when the ceramic electronic component receives a deflection stress generated by linear expansion and contraction of a printed circuit board brought about by the reception of a heat cycle or a tensile stress applied to an external electrode. That is, when a stress exceeds a strength of a laminate body (ceramic base body), cracks occur in the laminate body (ceramic base body).

As a countermeasure for such problems, for example, as disclosed in Japanese Patent Application Laid-Open No. H11-162771, there has been proposed a technique where a conductive thermosetting resin including metal powder is used to form an external electrode of a multilayer ceramic electronic component so that, even under a severe environment, a stress which the multilayer ceramic electronic component receives from a substrate can be attenuated such that the occurrence of cracks on the laminate body can be suppressed.

For example, in the multilayer ceramic electronic component disclosed in Japanese Patent Application Laid-Open No. H11-162771, in general, a thermosetting resin layer is formed so as to completely cover a fired electrode layer. Such a multilayer ceramic electronic component is designed as follows. When a large substrate deflection stress is applied, a rupture crack is made to occur in a thermosetting resin layer, an interface between the thermosetting resin layer and a nickel plating layer, or an interface between the thermosetting resin layer and a capacitor body (laminate body) using a distal end of the thermosetting resin layer as an initiation point. With such a configuration, it is possible to impart a fail-safe function to release a stress applied to the multilayer ceramic capacitor thus suppressing the progress of the crack into the capacitor body.

However, the progress of the rupture crack is not limited to only any one of the inside of the thermosetting resin layer, the interface between the thermosetting resin layer and the nickel plating layer, and the interface between the thermosetting resin layer and the capacitor body. There is a possibility that the progress of the rupture crack is bent from a thermosetting resin layer side toward a capacitor body side. This is attributed to the fact that the fragility at a fragile portion which performs a fail-safe function is unstable and a rupture path which starts from a distal end of a fired electrode layer is affected by irregularities in the above-mentioned fragility and the rupture path is easily changed toward the capacitor body side.

As a result, for example, there has been a problem in that when a multilayer ceramic electronic component is mounted on a printed circuit board, it is difficult for the multilayer ceramic electronic component to ensure stability in a fail-safe function against a bending stress of the printed circuit board.

SUMMARY OF THE INVENTION

Preferred embodiments of the present invention provide highly reliable multilayer ceramic electronic components which are each able to improve the stability of a fail-safe function against a crack caused by a stress which the multilayer ceramic electronic component receives from a substrate under a severe environment.

A multilayer ceramic electronic component according to a preferred embodiment of the present invention includes a laminate body including a plurality of ceramic layers which are laminated and a plurality of internal electrode layers which are laminated, the laminate body including a first main surface and a second main surface which face each other in a laminating direction, a first side surface and a second side surface which face each other in a width direction orthogonal or substantially orthogonal to the laminating direction, and a first end surface and a second end surface which face each other in a length direction orthogonal or substantially orthogonal to the laminating direction and the width direction, the plurality of internal electrode layers including a first internal electrode layer which is exposed on the first end surface, and a second internal electrode layer which is exposed on the second end surface; a first external electrode which is connected to the first internal electrode layer and is disposed on the first end surface, portions of the first and second main surfaces, and portions of the first and second side surfaces; and a second external electrode which is connected to the second internal electrode layer and is disposed on the second end surface, portions of the first and second main surfaces, and portions of the first and second side surfaces, wherein the first external electrode and the second external electrode each include a base electrode layer including metal; a conductive resin layer which is disposed on the base electrode layer and includes a thermosetting resin and a metal component; and a plating layer which is disposed on the conductive resin layer, the conductive resin layer includes a first layer disposed on the base electrode layer; a second layer disposed on the first layer; and a third layer disposed on the second layer, with respect to porosity which is an area ratio of pores obtained from a binary image within a predetermined field of view, the first layer and the third layer have a porosity of equal to or less than about 5% and the second layer has a porosity equal to or more than about 6%, and where a length of the first layer which is brought into contact with portions of the first and second main surfaces and the first and second side surfaces is denoted as a size A, a length of the second layer which is brought into contact with the first and second main surfaces and portions of the first and second side surfaces is denoted as a size B, and a length of the third layer which is brought into contact with the portions of the first and second main surfaces and the portions of the first and second side surfaces is denoted as a size C, a ratio of the size A, a ratio of the size B, and a ratio of the size C satisfy a relationship of the size A:the size B:the size C=about 15 or more and about 70 or less: about 10 or more and about 65 or less: about 10 or more and about 65 or less (wherein, the ratio of the size A+ the ratio of the size B+ the ratio of the size C=100).

According to preferred embodiments of the present invention, it is possible to provide highly reliable multilayer ceramic electronic components by improving stability of a fail-safe function against cracks caused by a stress which the multilayer ceramic electronic components receive from a substrate under a severe environment.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings.

1. Multilayer Ceramic Electronic Component

Figure 1:
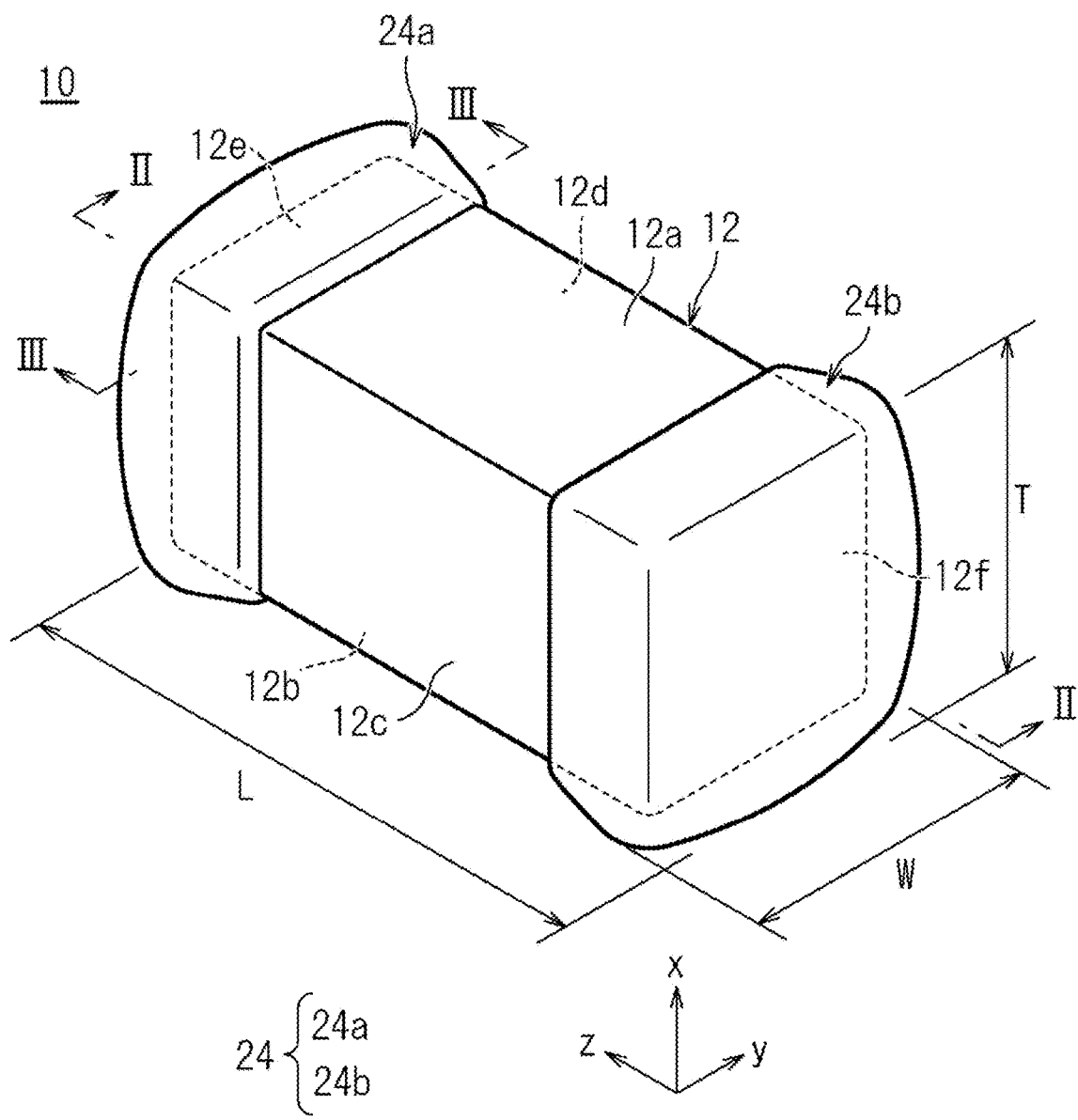
FIG. 1 is a perspective view of an external appearance showing one example of a multilayer ceramic capacitor according to a preferred embodiment of the present invention.
Figure 2:
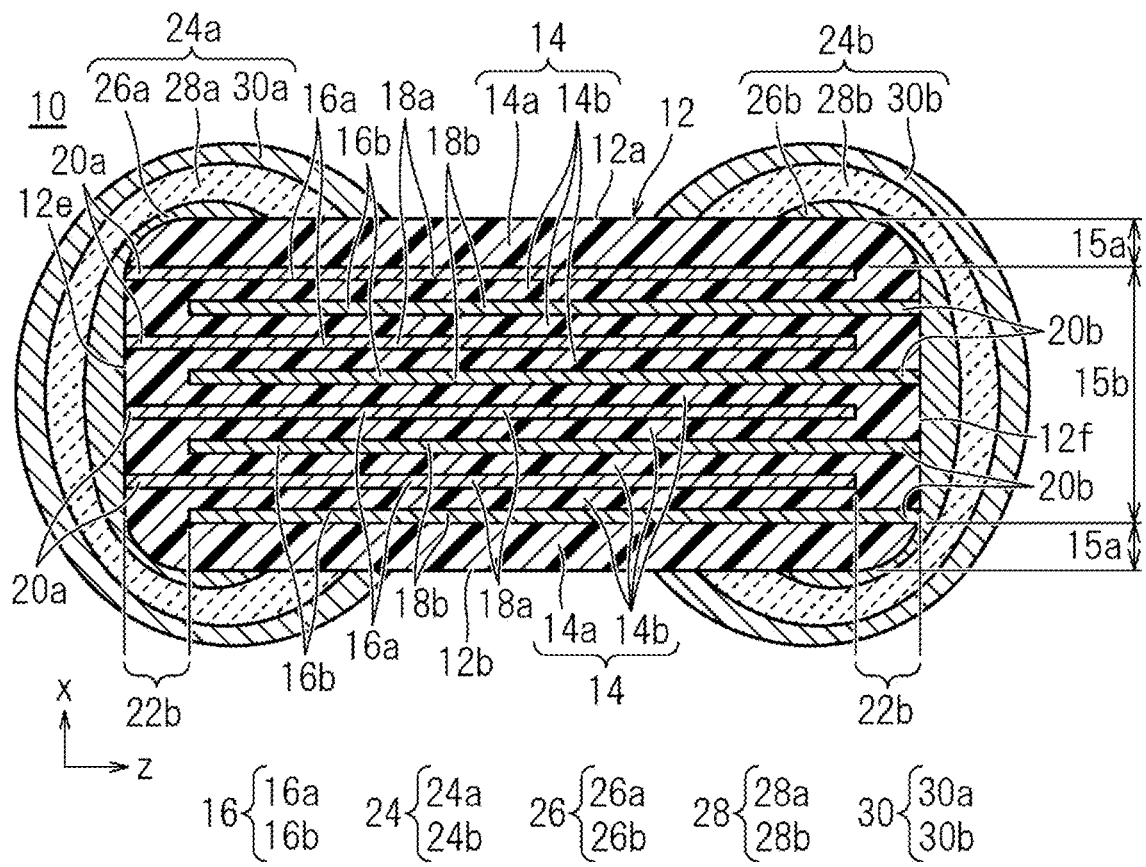
FIG. 2 is a cross-sectional view of the multilayer ceramic capacitor according to a preferred embodiment of the present invention taken along line II-II in FIG. 1.
Figure 3:
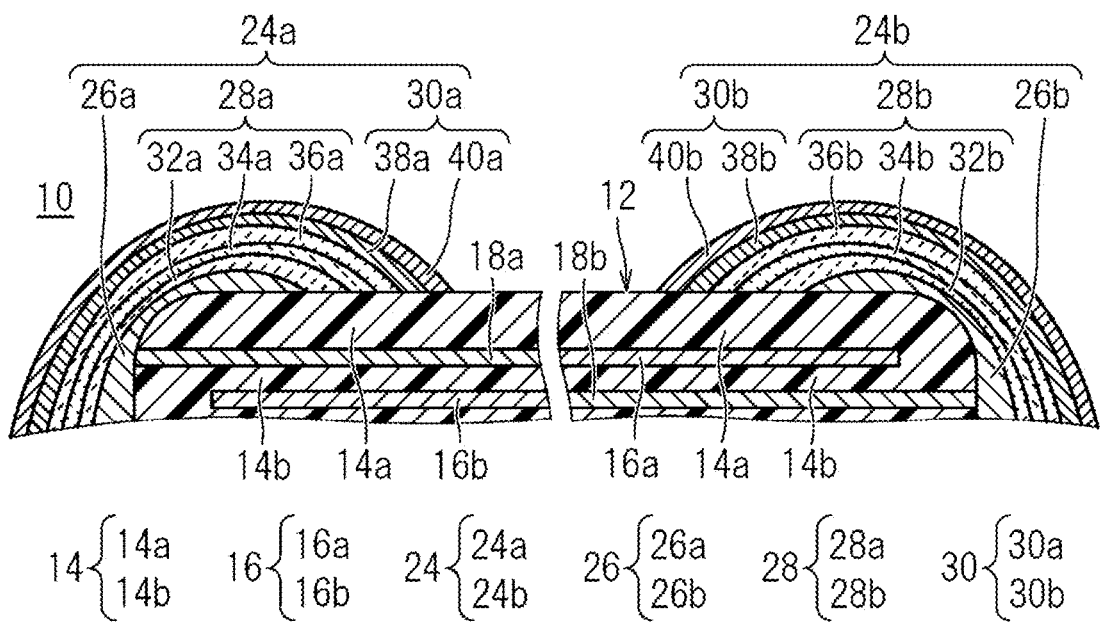
FIG. 3 is an enlarged view of an external electrode and an area in the vicinity of the external electrode in FIG. 2.
Figure 4:
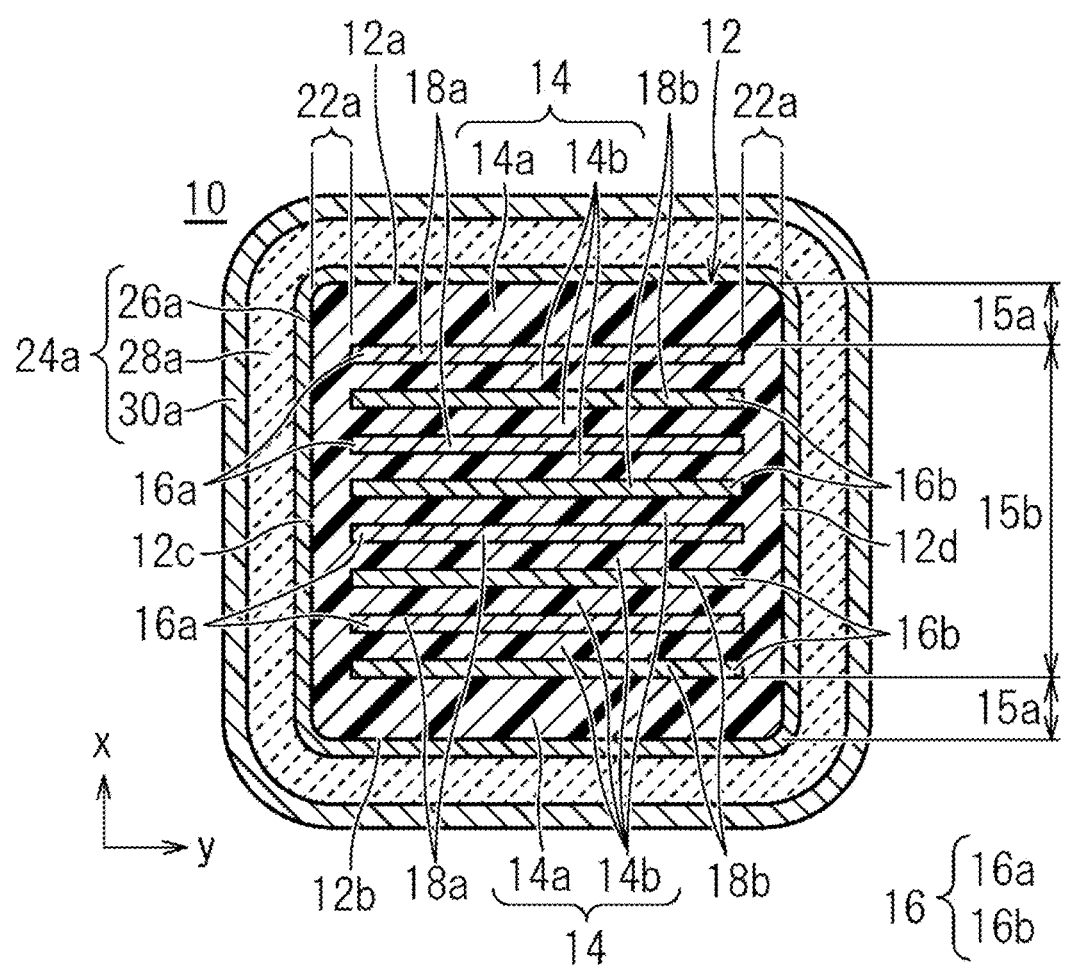
FIG. 4 is a cross-sectional view of the multilayer ceramic capacitor according to a preferred embodiment of the present invention taken along line III-III in FIG. 1.

A multilayer ceramic capacitor is described as an example of a multilayer ceramic electronic component according to a preferred embodiment of the present invention. FIG. 1 is a perspective view of an external appearance showing one example of a multilayer ceramic capacitor according to a preferred embodiment of the present invention. FIG. 2 is a cross-sectional view of the multilayer ceramic capacitor according to a preferred embodiment of the present invention taken along line II-II in FIG. 1, and FIG. 3 is an enlarged view of an external electrode and an area in the vicinity of the external electrode in FIG. 2. FIG. 4 is a cross-sectional view of the multilayer ceramic capacitor according to a preferred embodiment of the present invention taken along line III-III in FIG. 1.

As shown in FIG. 1 to FIG. 3, a multilayer ceramic capacitor 10 includes a rectangular or substantially rectangular parallelepiped laminate body 12.

The laminate body 12 includes a plurality of ceramic layers 14 and a plurality of internal electrode layers 16 which are laminated to each other. The laminate body 12 includes a first main surface 12a and a second main surface 12b which face each other in a laminating direction x, a first side surface 12c and a second side surface 12d which face each other in a width direction y orthogonal or substantially orthogonal to the laminating direction x, and a first end surface 12e and a second end surface 12f which face each other in a length direction z orthogonal or substantially orthogonal to the laminating direction x and the width direction y. It is preferable that corner portions and ridge portions of the laminate body 12 be rounded. The corner portion means a portion where any three surfaces of the laminate body which are disposed adjacently to each other intersect with each other, and the ridge portion means a portion where any two surfaces of the laminate body which are disposed adjacently to each other intersect with each other. Further, unevenness or the like may be provided on the first main surface 12a and the second main surface 12b, the first side surface 12c and the second side surface 12d, and the first end surface 12e and the second end surface 12f partially or wholly. A size of the laminate body 12 in the length direction z is not always longer than a size of the laminate body 12 in the width direction y.

Although the number of laminated ceramic layers 14 is not particularly limited, it is preferable that the number of laminated ceramic layers 14, for example, is set to 15 or more and 200 or less (including an external layer portion 15a described later).

The laminate body 12 includes external layer portions 15a each of which includes a plurality of ceramic layers 14, and an internal layer portion 15b which includes a single or a plurality of ceramic layers 14 and a plurality of internal electrode layers 16 which are disposed on the ceramic layers 14. The external layer portion 15a is disposed on the first main surface 12a side and the second main surface 12b side of the laminate body 12. The external layer portion 15a on the first main surface 12a side is an assembled body including the plurality of ceramic layers 14 which are disposed between the first main surface 12a and the internal electrode layer 16 which is closest to the first main surface 12a. The external layer portion 15a on the second main surface 12b side is an assembled body including the plurality of ceramic layers 14 which are disposed between the second main surface 12b and the internal electrode layer 16 which is closest to the second main surface 12b. A region sandwiched between both the external layer portions 15a defines the internal layer portion 15b. It is preferable that a thickness of the external layer portion 15a is set to a value which falls within a range of from about 10 μm to about 300 μm inclusive, for example.

The size of the laminate body 12 is not particularly limited. However, for example, it is preferable that the size in a length direction z is set to a value which falls within a range of from about 0.90 mm to about 5.40 mm inclusive, the size in the width direction y is set to a value which falls within a range of from about 0.40 mm to about 4.92 mm inclusive, and the size in the laminating direction x is set to a value which falls within a range of from about 0.40 mm to about 2.96 mm inclusive.

For example, the ceramic layers 14 can be made of a dielectric material. As such a dielectric material, for example, dielectric ceramic including a component such as $BaTiO_3$, $CaTiO_3$, $SrTiO_3$, or $CaZrO_3$, for example, can be used. In the case where the ceramic layer 14 includes the above-mentioned dielectric material as a main component, a sub component such as a Mn compound, a Fe compound, a Cr compound, a Co compound, or an Ni compound whose content is smaller than the content of the main component may be added in conformity with a characteristic of the desired laminate body 12, for example.

In the case where piezoelectric ceramic is used for the laminate body 12, a multilayer ceramic electronic component defines and functions as a ceramic piezoelectric element. For example, as a specific example of the piezoelectric ceramic material, a lead zirconate titanate (PZT) based ceramic material or the like may be used.

In the case where semiconductor ceramic is used for the laminate body 12, a multilayer ceramic electronic component defines and functions as a thermistor element. For example, as a specific example of the semiconductor ceramic material, a spinel-based ceramic material or the like may be used.

In the case where magnetic ceramic is used for the laminate body 12, a multilayer ceramic electronic component defines and functions as an inductor element. When the multilayer ceramic electronic component defines and functions as an inductor element, the internal electrode layer 16 is preferably a coil-shaped conductor. For example, as a specific example of the magnetic ceramic material, a ferrite ceramic material or the like may be used.

It is preferable that a thickness of the ceramic layer 14 after being fired is set to a value which falls within a range of from about 0.5 μm to about 20.0 μm inclusive, for example.

The laminate body 12 includes, as the plurality of internal electrode layers 16, first internal electrode layers 16a and second internal electrode layers 16b each having a rectangular or substantially rectangular shape, for example. The first internal electrode layers 16a and the second internal electrode layers 16b are embedded in the laminate body 12 such that the first internal electrode layer 16a and the second internal electrode layer 16b are disposed alternately along the laminating direction x of the laminate body 12 at equal or substantially equal intervals.

The first internal electrode layer 16a includes a first counter electrode portion 18a which opposedly faces the second internal electrode layer 16b, and a first lead-out electrode portion 20a which is disposed on one end side of the one internal electrode layer 16a and extends from the first counter electrode portion 18a to the first end surface 12e of the laminate body 12. An end portion of first lead-out electrode portion 20a is led out to the first end surface 12e and is exposed to the outside.

The second internal electrode layer 16b includes a second counter electrode portion 18b which opposedly faces the first internal electrode layer 16a; and a second lead-out electrode portion 20b which is disposed on one end side of the second internal electrode layer 16b and extends from the second counter electrode portion 18b to the second end surface 12f of the laminate body 12. An end portion of the second lead-out electrode portion 20b is led out to the second end surface 12f and is exposed to the outside.

A shape of the first counter electrode portion 18a of the first internal electrode layer 16a and a shape of the second counter electrode portion 18b of the second internal electrode layer 16b are not particularly limited. However, the first counter electrode portion 18a and the second counter electrode portion 18b preferably have a rectangular or substantially rectangular shape. As a matter of course, corner portions of these counter electrode portions may be rounded or may have an oblique shape (tapered shape).

A shape of the first lead-out electrode portion 20a of the first internal electrode layer 16a and a shape of the second lead-out electrode portion 20b of the second internal electrode layer 16b are not particularly limited. However, the first lead-out electrode portion 20a and the second lead-out electrode portion 20b preferably have a rectangular or substantially rectangular shape. As a matter of course, corner portions of these counter electrode portions may be rounded or may have an oblique shape (tapered shape).

A width of the first counter electrode portion 18a of first internal electrode layer 16a and a width of the first lead-out electrode portion 20a of first internal electrode layer 16a may be equal or substantially equal to each other, or the width of either the first counter electrode portion 18a of the first internal electrode layer 16a or the width of the first lead-out electrode portion 20a of the first internal electrode layer 16a may be narrower than the width of the other. In the same or similar manner, a width of the second counter electrode portion 18b of the second internal electrode layer 16b and a width of the second lead-out electrode portion 20b of the second internal electrode layer 16b may be set equal or substantially equal to each other, or the width of either the second counter electrode portion 18b of the second internal electrode layer 16b or the second lead-out electrode portion 20b of the second internal electrode layer 16b may be narrower than the width of the other.

The laminate body 12 includes a side portion (W gap) 22a of the laminate body 12 provided between first ends of the first counter electrode portions 18a and the second counter electrode portions 18b in the width direction y and the first side surface 12c, and a side portion (W gap) 22a of the laminate body 12 provided between second ends of the first counter electrode portions 18a and the second counter electrode portions 18b in the width direction y and the second side surface 12d. Further, the laminate body 12 includes an end portion (L gap) 22b of the laminate body 12 provided between end portions of the first internal electrode layers 16a on a side opposite to the first lead-out electrode portions 20a and the second end surface 12f; and an end portion (L gap) 22b of the laminate body 12 provided between end portions of the second internal electrode layers 16b on a side opposite to the second lead-out electrode portions 20b and the first end surface 12e.

The internal electrode layer 16 includes a suitable conductive material. The conductive material may preferably be, for example, metal such as Ni, Cu, Ag, Pd, or Au, or an alloy which includes at least one of these metals such as an Ag—Pd alloy or the like, for example. As a resin component used in an internal-electrode-use conductive paste for the internal electrode layer 16, ethyl cellulose or an acrylic resin, for example, is preferably used.

A thickness of the internal electrode layer 16 is preferably set to a value which falls within a range of from about 0.2

μm to about 2.0 μm inclusive, for example. Further, the number of internal electrode layers 16 is preferably set to a value which falls within a range of from 15 to 200 inclusive, for example.

An external electrode 24 is disposed on the first end surface 12e side and the second end surface 12f side of the laminate body 12. The external electrode 24 includes a first external electrode 24a and the second external electrode 24b.

The first external electrode 24a is disposed on a surface of the first end surface 12e of the laminate body 12. The first external electrode 24a extend from the first end surface 12e so as to cover a portion of the first main surface 12a, a portion of the second main surface 12b, a portion of the first side surface 12c, and a portion of the second side surface 12d. In this case, the first external electrode 24a is electrically connected to the first lead-out electrode portions 20a of the first internal electrode layers 16a. The first external electrode 24a may be provided on only the first end surface 12e of the laminate body 12.

The second external electrode 24b is disposed on a surface of the second end surface 12f of the laminate body 12. The second external electrode 24b extends from the second end surface 12f so as to cover a portion of the first main surface 12a, a portion of the second main surface 12b, a portion of the first side surface 12c, and a portion of the second side surface 12d. In this case, the second external electrode 24b is electrically connected to the second lead-out electrode portions 20b of the second internal electrode layers 16b. The second external electrode 24b may be provided on only the second end surface 12f of the laminate body 12.

In the laminate body 12, an electrostatic capacitance is generated by arranging the first counter electrode portion 18a of the first internal electrode layer 16a and the second counter electrode portion 18b of the second internal electrode layer 16b to opposedly face each other with the ceramic layer 14 interposed therebetween. Accordingly, an electrostatic capacitance can be generated between the first external electrode 24a to which the first internal electrode layers 16a are connected and the second external electrode 24b to which the second internal electrode layers 16b are connected and thus, the capacitor obtains its characteristics.

Figure 5A:
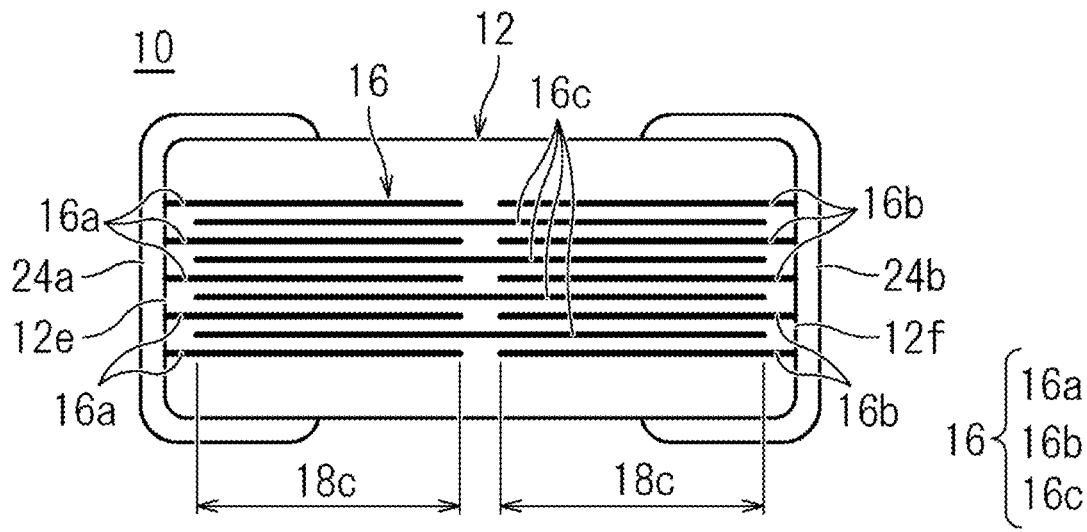
FIG. 5A is a cross-sectional view of the structure taken along the line II-II in FIG. 1 where a counter electrode portion of an internal electrode layer of the multilayer ceramic capacitor according to a preferred embodiment of the present invention is divided into two.
Figure 5B:
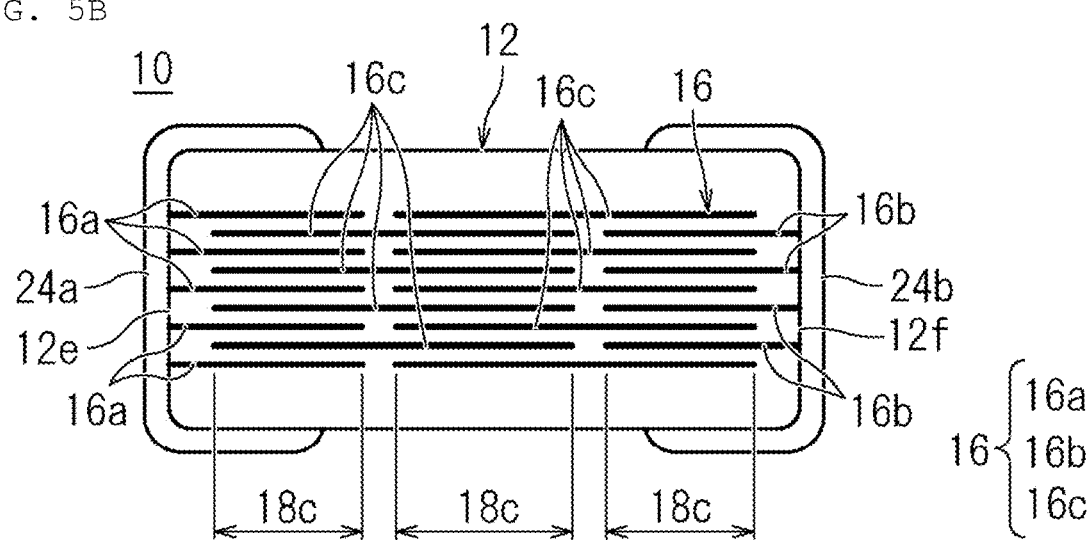
FIG. 5B is a cross-sectional view of the structure taken along the line II-II in FIG. 1 where the counter electrode portion of the internal electrode layer of the multilayer ceramic capacitor according to a preferred embodiment of the present invention is divided into three.
Figure 5C:
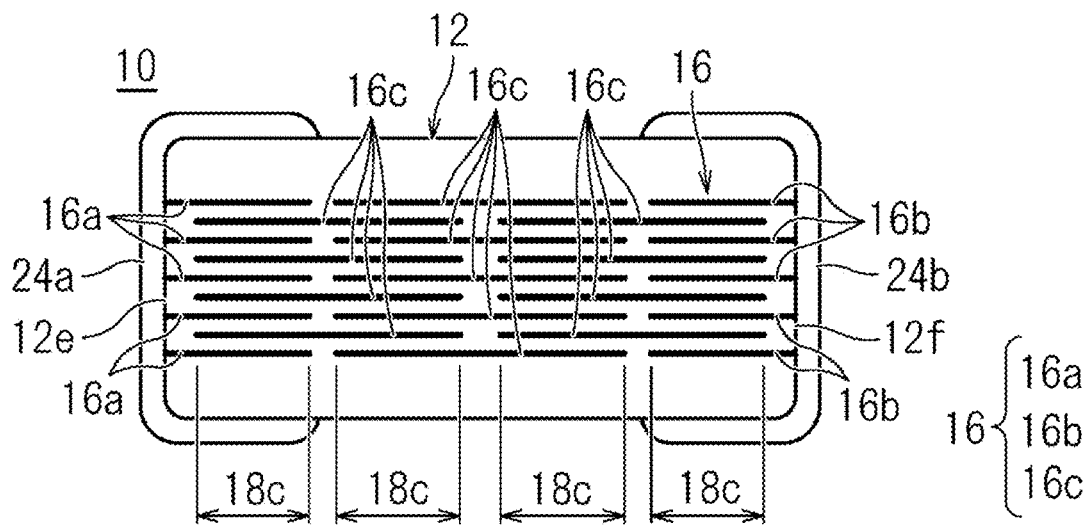
FIG. 5C is a cross-sectional view of the structure taken along the line II-II in FIG. 1 where the counter electrode portion of the internal electrode layer of the multilayer ceramic capacitor according to a preferred embodiment of the present invention is divided into four.

As shown in FIGS. 5A to 5C, as the internal electrode layers 16, floating internal electrode layers 16c which are led to neither the first end surface 12e nor the second end surface 12f may be provided in addition to the first internal electrode layers 16a and the second internal electrode layers 16b, and the counter electrode portion 18c may be divided into a plurality of electrode portions by the floating internal electrode layers 16c. For example, the counter electrode portion 18c has a two tandem structure as shown in FIG. 5A, a three tandem structure as shown in FIG. 5B, or a four tandem structure as shown in FIG. 5C, and the counter electrode portion 18c may have more than a four tandem structure, for example. In this manner, by dividing the counter electrode portion 18c into the plurality of electrode portions, a plurality of capacitor components are provided between the internal electrode layers 16a, 16b, 16c opposedly facing each other so that the capacitor components are connected in series. Accordingly, voltages applied to the respective capacitor components are lowered thus obtaining a multilayer ceramic capacitor having a high withstand voltage.

The first external electrode 24a and the second external electrode 24b each include a base electrode layer 26 including conductive metal and a glass component, a conductive resin layer 28 covering the base electrode layer 26 and including a thermosetting resin and a metal component, and a plating layer 30 covering the conductive resin layer 28.

The base electrode layer 26 includes a first base electrode layer 26a and a second base electrode layer 26b.

The first base electrode layer 26a is disposed on the surface of the first end surface 12e of the laminate body 12, and is extends from the first end surface 12e so as to cover a portion of the first main surface 12a, a portion of the second main surface 12b, a portion of the first side surface 12c, and a portion of the second side surface 12d.

The second base electrode layer 26b is disposed on the surface of the second end surface 12f of the laminate body 12, and extends from the second end surface 12f so as to cover a portion of the first main surface 12a, a portion of the second main surface 12b, a portion of the first side surface 12c, and a portion of the second side surface 12d.

The first base electrode layer 26a may be provided on only the surface of the first end surface 12e of the laminate body 12, and the second base electrode layer 26b may be provided on only the surface of the second end surface 12f of the laminate body 12.

The base electrode layer 26 preferably includes at least one layer selected from a group consisting of a fired layer, a plating layer, a thin film layer, and the like, for example.

First, the first base electrode layer 26a and the second base electrode layer 26b where the base electrode layer 26 is provided of a fired layer are described.

The fired layer preferably includes glass and metals, for example. As the metal in the fired layer, the fired layer preferably includes at least one material selected from a group consisting of Cu, Ni, Ag, Pd, an Ag—Pd alloy, Au, and the like, for example. As glass in the fired layer, the fired layer preferably includes at least one material selected from a group consisting of B, Si, Ba, Mg, Al, Li, and the like, for example. The fired layer may include a plurality of layers. The fired layer is a layer formed by applying a conductive paste including glass and metal to the laminate body 12 and by firing the conductive paste. The fired layer may be formed by firing simultaneously with the formation of the ceramic layers 14 and the internal electrode layers 16. Alternatively, the fired layer may be formed by firing after the ceramic layers 14 and the internal electrode layers 16 are formed by firing. When the ceramic layers 14 and the internal electrode layers 16 are simultaneously formed by firing, it is preferable to use a ceramic material the same as or similar to the ceramic material used for the ceramic layers 14 in place of glass.

Thicknesses of the fired layers at center portions of the base electrode layers 26 in a height direction disposed on the first end surface 12e and the second end surface 12f are each preferably set to a value which falls within a range of from about 10 μm to about 260 μm inclusive, for example.

When the base electrode layers are provided on surfaces of the first main surface 12a and the second main surface 12b and on surfaces of the first side surface 12c and the second side surface 12d, it is preferable that thicknesses of the fired layers at center portions of the first base electrode layers and the second base electrode layers disposed on the surfaces of the first main surface 12a and the second main surface 12b and on the surfaces of the first side surface 12c and the second side surface 12d in the length direction each are preferably set to a value which falls within a range of from about 3 μm to about 60 μm inclusive, for example.

Next, a description is provided with respect to the first base electrode layer and the second base electrode layer where the base electrode layer 26 is a plating layer.

It is preferable that the plating layer include a lower layer plating electrode provided on a surface of the laminate body 12, and an upper layer plating electrode provided on a surface of the lower layer plating electrode. It is preferable that the lower layer plating electrode and the upper layer plating electrode each include at least one kind of metal selected from a group consisting of Cu, Ni, Sn, Pb, Au, Ag, Pd, Bi, Zn and the like, or an alloy containing one kind of such metal, for example.

It is preferable, for example, that the lower layer plating electrode is made using Ni which has a solder barrier performance, and it is preferable that the upper layer plating electrode is made using Sn or Au which has favorable wettability with solder.

For example, in the case where the first internal electrode layers 16a and the second internal electrode layers 16b are made using Ni, it is preferable that the lower layer plating electrode is made using Cu, for example, which has favorable bonding ability with Ni. The upper layer plating electrode may be provided when necessary. The first external electrode 24a and the second external electrode 24b each may include only the lower layer plating electrode. In the case where the base electrode layer 26 is made of a plating layer, the plating layer may be formed such that an upper layer plating electrode is formed as an outermost layer. Alternatively, another plating electrode may be formed on a surface of the upper layer plating electrode. A thickness per one layer of the plating layer disposed without being provided with the base electrode layer 26 is preferably set to a value which falls within a range of from about 1 μm to about 15 μm inclusive, for example. It is preferable that the plating layer does not include glass. It is preferable that a ratio of metal per unit volume of the plating layer is set to equal to or more than about 99 vol %, for example.

In the case where the base electrode layer is made of a thin film layer, the thin film layer is a layer which is formed by a thin film forming method such as a sputtering method, a vapor deposition method, or the like, for example, and has a thickness of, for example, about 1 μm or less where metal particles are deposited.

The conductive resin layer 28 includes a first conductive resin layer 28a and a second conductive resin layer 28b.

The first conductive resin layer 28a is disposed so as to cover the surface of first base electrode layer 26a, and a portion of the first main surface 12a, a portion of the second main surface 12b, a portion of the first side surface 12c and a portion of the second side surface 12d.

The second conductive resin layer 28b is disposed so as to cover the surface of the second base electrode layer 26b, and a portion of the first main surface 12a, a portion of the second main surface 12b, a portion of the first side surface 12c and a portion of the second side surface 12d.

The first conductive resin layer 28a includes one first layer 32a disposed on a surface of the first base electrode layer 26a, one second layer 34a disposed on a surface of the one first layer 32a, and one third layer 36a disposed on a surface of the one second layer 34a. Specifically, it is preferable that one first layer 32a covers the first base electrode layer 26a, one second layer 34a covers the one first layer 32a, and one third layer 36a covers one second layer 34a. In such a configuration, one first layer 32a, one second layer 34a, and one third layer 36a may be provided such that an electrode film may be terminated at the corner portions of the laminate body 12.

The second conductive resin layer 28b includes the second first layer 32b disposed on a surface of the second base electrode layer 26b, the other second layer 34b disposed on a surface of the other first layer 32b; and the other third layer 36b disposed on a surface of the other second layer 34b. Specifically, it is preferable that the other first layer 32b covers the other base electrode layer 26b, the other second layer 34b covers the other first layer 32b, and the other third layer 36b covers the other second layer 34b. In such a configuration, in the other first layer 32b, the other second layer 34b, and the other third layer 36b, the electrode film may be terminated at the corner portions of the laminate body 12.

With respect to the one first layer 32a and the other first layer 32b, and the one third layer 36a and the other third layer 36b, the porosity which is an area ratio of pores obtained from a binary image within a predetermined field of view is preferably set to be equal to or less than about 15%, and the porosity of the second layer is set be equal to or more than about 6%, for example.

With such a configuration, even when a deflection stress is applied to the substrate, the porosity in the conductive resin layers of the second layers 34a, 34b is high and a coagulation force is small. Accordingly, before rupture cracks occur in the laminate body 12 due to the deflection stress, it is possible to make the rupture cracks occur and progress in the conductive resin layers of the second layers 34a, 34b and thus, the deflection stress applied to the multilayer ceramic capacitor 10 can be released. As a result, it is possible to reduce or prevent the occurrence of cracks in the laminate body 12.

When the porosities in the conductive resin layers of the second layers 34a, 34b are less than about 5%, the coagulation forces of the conductive resin layers of the second layers 34a, 34b are increased. Accordingly, a stress cannot be sufficiently released so that the laminate body 12 cannot provide a fail-safe function in a stable manner and thus, when a deflection stress is applied to the substrate, there may be a case where cracks occur in the laminate body 12.

Further, the porosities of the conductive resin layers of the second layers 34a, 34b are preferably set to equal to or less than about 50%, for example. When the porosities of the conductive resin layers of the second layers 34a, 34b are more than about 50%, the conductive resin layers become films having a large number of pores and thus, a conductive path becomes discontinuous so that conductivity of the conductive resin layer 28 is reduced and the ESR is increased.

Further, due to the presence of the conductive resin layers of the first layers 32a, 32b, it is possible to prevent the progress of the rupture cracks generated on the conductive resin layers of the second layers 34a, 34b from being bent toward a laminate body 12 side (that is, the progress of the cracks toward the laminate body). Accordingly, when a deflection stress is applied to the conductive resin layers, the destination of the progress of the rupture cracks in the conductive resin layer 28 can be stably selected toward the conductive resin layers of the second layers 34a, 34b and thus, it is possible to prevent the occurrence of rupture cracks on the laminate body 12 in a stable manner.

When the porosities in the conductive resin layers of the first layers 32a, 32b are larger than about 5%, the coagulation forces of the conductive resin layers of the first layers 32a, 32b are lowered. Accordingly, rupture cracks caused by a stress attributed to a substrate deflection generated in the conductive resin layers of the second layers 34a, 34b progress also to the conductive resin layers of the first layers 32a, 32b. As a result, the progress of the rupture cracks is bent toward the laminate body 12 side (cracks progress toward the laminate body), and thus, there is a possibility that the stability of a fail-safe function is deteriorated so that cracks occur in the laminate body 12.

Further, due to the presence of the conductive resin layers of the third layers 36a, 36b, it is possible to protect the conductive resin layers of the second layers 34a, 34b thus maintaining in a stable manner a state where the coagulation forces of the conductive resin layers of the second layers 34a, 34b are low.

When the porosities in the conductive resin layers of the third layers 36a, 36b are larger than about 5%, pores in the conductive resin layers of the third layers 36a, 36b are increased so that an infiltration route of moisture such as a plating liquid is likely to be generated. As a result, moisture such as a plating liquid is likely to infiltrate into the laminate body from the conductive resin layers of the third layers 36a, 36b thus leading to the infiltration of moisture such as a plating liquid to the conductive resin layers of the second layers 34a, 34b where a coagulation force should be maintained at a low level. Due to such an infiltration of moisture, a coagulation force of the conductive resin layers of the second layers 34a, 34b cannot be maintained at a low level. Accordingly, in the case where a deflection stress is applied to the printed circuit board on which the multilayer ceramic electronic component of the present preferred embodiment is mounted, it is not possible to sufficiently attenuate the stress by making ruptures progress in the conductive resin layers of the second layers 34a, 34b (that is, it is not possible to make the laminate body 12 to provide a fail-safe function) so that cracks occur in the laminate body 12.

Next, a description is provided with respect to a method of measuring the porosity which is an area ratio of pores obtained from a binary image within a predetermined field of view.

The multilayer ceramic capacitor 10 is polished such that polishing is applied to either the first side surface 12c or the second side surface 12d of the multilayer ceramic capacitor 10 along the first side surface 12c or the second side surface 12d. Polishing is performed by an amount of a length which is about half of a length of the multilayer ceramic capacitor 10 in a direction that the first side surface 12c and the second side surface 12d are perpendicularly or substantially perpendicularly connected to each other (about ½ W). Then, in the polished cross section, a picture of the conductive resin layer is taken using a scanning electron microscope (SEM) with the range definition of the microscope such that only the conductive resin layer 28 on the first main surface 12a and the second main surface 12b is in the field of view.

Then, using software which can binarize an image, a range where an image is binarized is adjusted such that pores and portions other than the pores are clearly distinguished from each other thus obtaining a result of image binarization. Then, porosities of the first layers 32a, 32b, the second layers 34a, 34b, and the third layers 36a, 36b are calculated from values of the binarization result of the respective layers.

Figure 6:
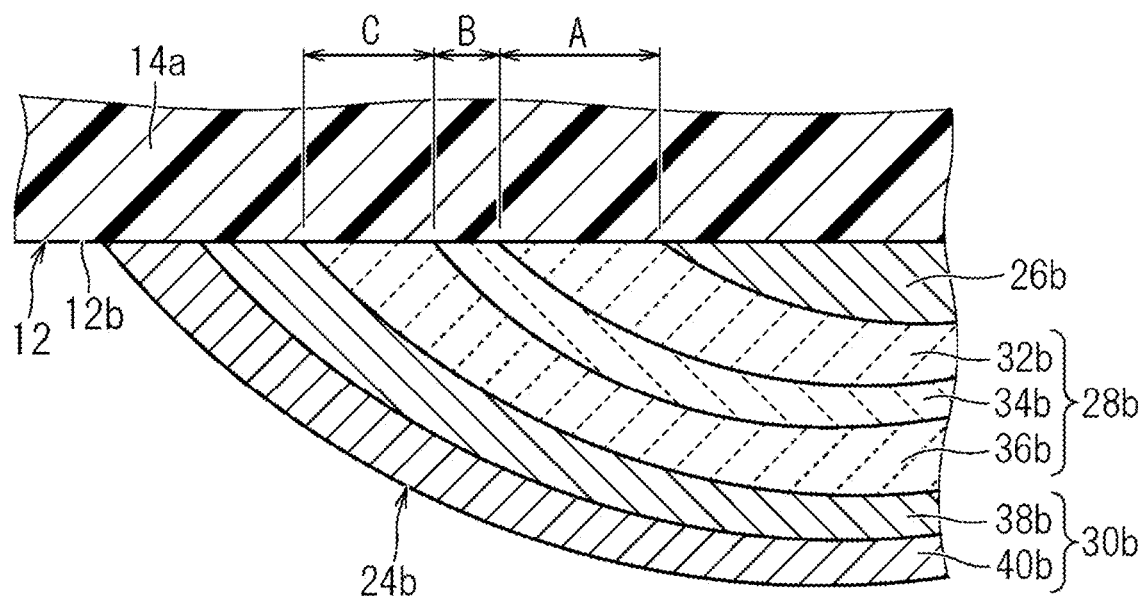
FIG. 6 is an explanatory view showing ranges which define a size A, a size B, and a size C in a conductive resin layer.

Further, as shown in FIG. 6, the multilayer ceramic capacitor 10 according to the present preferred embodiment has a structure such that where a length of the first layer 32a, 32b which is brought into contact with a portion of the first main surface 12a and a portion of the second main surface 12b, and a portion of the first side surface 12c and a portion of the second side surface 12d is denoted as a size A, a length of the second layer 34a, 34b which is brought into contact with a portion of the first main surface 12a and a portion of the second main surface 12b and a portion of the first side surface 12c and a portion of the second side surface 12d is denoted as a size B, and a length of the third layer 36a, 36b which is brought into contact with a portion of the first main surface 12a and a portion of the second main surface 12b and a portion of the first side surface 12c and a portion of the second side surface 12d is denoted as a size C, a ratio of the size A, the size B, and the size C satisfies a relationship of size A:size B:size C=about 15 or more and about 70 or less: about 10 or more and about 65 or less: about 10 or more and about 65 or less (wherein, a ratio of the size A+ a ratio of the size B+ a ratio of the size C=100).

With such a configuration, even when a deflection stress is applied to the substrate, before rupture cracks occur in the laminate body 12 due to the deflection stress, it is possible for the rupture cracks to progress in the conductive resin layers of the second layers 34a, 34b, thus releasing the deflection stress applied to the laminate body 12. Consequently, the occurrence of cracks in the laminate body 12 can be reduced or prevented.

In the case where ratios of the sizes B of the conductive resin layers of the second layers 34a, 34b are smaller than about 10, the sizes of the conductive resin layers of the second layers 34a, 34b disposed on the first main surface 12a and the second main surface 12b and the first side surface 12c and the second side surface 12d are shortened. Accordingly, it is impossible to make the rupture cracks for releasing a stress sufficiently occur in the conductive resin layers of the second layers 34a, 34b and thus, the laminate body 12 cannot provide in a stable manner a fail-safe function due to the progress of ruptures in the conductive resin layers of the second layers 34a, 34b. As a result, when a deflection stress is applied to the substrate, cracks are generated in the laminate body 12.

On the other hand, in the case where the ratios of the sizes B of the conductive resin layers of the second layers 34a, 34b are larger than about 65, the sizes B of the second layers 34a, 34b disposed on the first main surface 12a and the second main surface 12b and the first side surface 12c and the second side surface 12d are elongated. Accordingly, the sizes B are less than a lower limit of the size ratio which the conductive resin layers of the first layers 32a, 32b or the conductive resin layers of the third layers 36a, 36b require and thus, it is difficult for the conductive resin layers of the first layers 32a, 32b and the third layers 36a, 36b to provide their original functions.

In the case where the ratios of the sizes A of the first layers 32a, 32b are smaller than about 15, it is difficult for the conductive resin layers of the first layers 32a, 32b to provide their functions. Accordingly, the progress of cracks caused by a stress due to substrate deflection generated in the conductive resin layers of the second layers 34a, 34b extends also to the conductive resin layers of the first layers 32a, 32b. As a result, the progress of cracks is bent toward the laminate body 12 (cracks progress toward the laminate body 12) and thus, the stability of a fail-safe function is deteriorated which results in a possibility that cracks occur in the laminate body 12.

On the other hand, in the case where the ratios of the sizes A of the conductive resin layers of the first layers 32a, 32b are larger than about 70, the sizes A of the conductive resin layers of the first layers 32a, 32b disposed on the first main surface 12a and the second main surface 12b and the first side surface 12c and the second side surface 12d are elongated. Accordingly, the sizes A are less than a lower limit of the size ratio which the conductive resin layers of the second layers 34a, 34b or the conductive resin layers of the third layers 36a, 36b require and thus, it is difficult for the conductive resin layers of the second layers 34a, 34b and the conductive resin layers of the third layers 36a, 36b to provide their original function.

Further, when ratios of the sizes C of the conductive resin layers of the third layers 36a, 36b are smaller than about 10, the sizes C of the conductive resin layers of the third layers 36a, 36b disposed on the first main surface 12a and the second main surface 12b and the first side surface 12c and the second side surface 12d are shortened and thus, there is a possibility that moisture such as a plating liquid infiltrates into the conductive resin layers of the second layers 34a, 34b beyond the conductive resin layers of the third layers 36a, 36b. Accordingly, it is difficult to ensure the sufficient sealing property to seal the conductive resin layers of the second layers 34a, 34b which the third layers 36a, 36b have as the function thereof. Accordingly, moisture such as a plating liquid is likely to infiltrate into the laminate body from the conductive resin layers of the third layers 36a, 36b thus allowing the infiltration of moisture such as a plating liquid into the conductive resin layers of the second layers 34a, 34b where a coagulation force should be maintained at a low level. Due to such infiltration of moisture, a coagulation force of the conductive resin layers of the second layers 34a, 34b cannot be maintained at a low level. Accordingly, in the case where a deflection stress is applied to the printed circuit board on which the multilayer ceramic capacitor of the present invention is mounted, it is impossible to sufficiently attenuate the stress by enabling the progress of a rupture in the conductive resin layers of the second layers 34a, 34b (that is, a fail-safe function is not provided) thus resulting in a possibility that cracks occur in the laminate body 12.

In the case where the ratios of the sizes C of the conductive resin layers of the third layers 36a, 36b are larger than about 65, the sizes C of the conductive resin layers of the third layers 36a, 36b disposed on the first main surface 12a and the second main surface 12b and the first side surface 12c and the second side surface 12d are elongated. Accordingly, it is difficult to ensure the sufficient sizes of the conductive resin layers of the first layers 32a, 32b and the conductive resin layers of the second layers 34a, 34b disposed on the first main surface 12a and the second main surface 12b and the first side surface 12c and the second side surface 12d. Accordingly, the ratios of the sizes C are less than the lower limit of the size ratio which the conductive resin layers of the first layers 32a, 32b or the conductive resin layers of the second layers 34a, 34b require and thus, it is difficult for the conductive resin layers of the first layers 32a, 32b and the conductive resin layers of the second layers 34a, 34b to provide their original function.

Next, a description is provided with respect to a method of measuring size ratios of the first layers 32a, 32b, the second layers 34a, 34b, and the third layers 36a, 36b which form the conductive resin layers 28.

Polishing is applied to either the first side surface 12c or the second side surface 12d of the multilayer ceramic capacitor 10 along the first side surface 12c or the second side surface 12d, and the polishing is performed by an amount of a length which is about half of a length in a direction that the first side surface 12c and the second side surface 12d are vertically connected to each other (about ½ W). Then, in the polished cross section, a size of the first layer 32a, 32b of the conductive resin layer 28 which is brought into contact with the first main surface 12a and the second main surface 12b in the length direction z along which the first end surface 12e and the second end surface 12f are connected to each other is measured and is set as the size A. A size of the second layer 34a, 34b of the conductive resin layer 28 which is brought into contact with the first main surface 12a and the second main surface 12b in the length direction z along which the first end surface 12e and the second end surface 12f are connected to each other is measured and set as the size B. A size of the third layer 36a, 36b of the conductive resin layer 28 which is brought into contact with the first main surface 12a and the second main surface 12b in the length direction z along which the first end surface 12e and the second end surface 12f are connected to each other is measured and is set as the size C. Then, the sum of the size A, the size B, and the size C is defined as 100, and size ratios of the respective layers are calculated.

It is preferable that thicknesses of first conductive resin layer 28a and the second conductive resin layer 28b at a center portion in a height direction of the first conductive resin layer 28a disposed at the first end surface 12e and at a center portion in a height direction of the second conductive resin layer 28b disposed at the second end surface 12f is set to a value which falls within a range of from about 10 μm to about 200 μm inclusive, for example. It is also preferable that thicknesses of the first conductive resin layer 28a and the second conductive resin layer 28b at a center portion in the length direction z of the first conductive resin layer 28a and at a center portion in the length direction z of the second conductive resin layer 28b respectively disposed at the first main surface 12a and the second main surface 12b, and the first side surface 12c and the second side surface 12d is set to a value which falls within a range of from approximately about 3 μm to about 60 μm inclusive, for example.

The conductive resin layer 28 preferably includes a thermosetting resin and metal. The conductive resin layer 28 preferably includes a thermosetting resin and thus, for example, the conductive resin layer 28 has more flexibility than a conductive layer made of a plating film or a fired material made by firing a conductive paste. Accordingly, even in the case where a physical impact or an impact due to a heat cycle is applied to the multilayer ceramic capacitor, the conductive resin layer 28 defines and functions as a buffer layer thus preventing the occurrence of cracks in the multilayer ceramic capacitor.

As the metal included in the conductive resin layer 28, for example, Ag, Cu or an alloy of such metals may preferably be used. A material formed by applying Ag coating to a surface of metal powder can be used. In the case where the material formed by applying Ag coating to the surface of metal powder is used, it is preferable to use Cu or Ni as metal powder. Further, a material formed by applying oxidation preventing treatment to Cu can be used. Particularly, the use of conductive metal powder made of Ag as the metal included in the conductive resin layer 28 is preferable. Because Ag has the lowest resistivity among metals, Ag is suitable as a material for an electrode. Further, Ag is a noble metal and thus, Ag is not oxidized and has high weatherability. The use of metal to which an Ag coating is applied as the metal included in the conductive resin layer 28 is preferable, because inexpensive metal can be used as a base material while maintaining the above-mentioned characteristics of Ag.

As the metal included in the conductive resin layer, metal powder made of one type of metal may be used, or metal powder made of a plurality of types of metals, for example, a first metal component and a second metal component may be used.

It is preferable that the first metal component is Sn, In, Bi, or an alloy containing at least one kind of these metals, for example. Among these metals, the first metal component is preferably Sn or an alloy including Sn, for example. As specific examples of the alloy including Sn, Sn—Ag, Sn—Bi, Sn—Ag—Cu or the like can be used.

It is preferable that the second metal component is made of metal such as Cu, Ag, Pd, Pt, Au, or an alloy containing at least one kind of these metals, for example. Among these metals, it is preferable that the second metal component be Cu or Ag, for example.

Metal included in the conductive resin layer 28 mainly provides electric conductivity to the conductive resin layer 28. Specifically, due to contact between conductive fillers, a conduction path is provided in the conductive resin layer 28.

As a resin for the conductive resin layer 28, for example, known various kinds of thermosetting resins such as an epoxy resin, a phenol resin, a urethane resin, a silicon resin, and a polyimide resin, for example, can be used. Among these resins, an epoxy resin which is excellent in heat resistance, humidity resistance, adhesiveness and the like is a preferable resin.

Further, it is preferable that the conductive resin layer 28 includes a curing agent together with a thermosetting resin. In the case where an epoxy resin is used as the base resin, as a curing agent for the epoxy resin, known types of compounds such as a phenol-based curing agent, an amine-based curing agent, an acid anhydride-based curing agent, an imidazole-based curing agent or the like, for example, can be used.

The plating layer 30 includes a first plating layer 30a and a second plating layer 30b. The plating layer 30 covers the conductive resin layer 28.

Specifically, it is preferable that the first plating layer 30a is disposed on the first end surface 12e on the first conductive resin layer 28a, and the first plating layer 30a extends to the first main surface 12a, the second main surface 12b, the first side surface 12c, and the second side surface 12d of the first conductive resin layer 28a. In this case, the first plating layer 30a may be disposed on only the first end surface 12e of the first conductive resin layer 28a.

Further, it is preferable that the second plating layer 30b is disposed on the second end surface 12f on the second conductive resin layer 28b, and the second plating layer 30b extends to the first main surface 12a, the second main surface 12b, the first side surface 12c, and the second side surface 12d of the second conductive resin layer 28b. In this case, the second plating layer 30b may be disposed on only the second end surface 12f of the second conductive resin layer 28b.

Further, the plating layer 30 preferably includes, for example, at least one material selected from a group of Cu, Ni, Sn, Ag, Pd, an Ag—Pd alloy, Au and the like.

The plating layer 30 may include a plurality of layers. In this case, it is preferable that the plating layer have a double-layer structure including a Ni plating layer and a Sn plating layer.

That is, the first plating layer 30a includes a first Ni plating layer 38a and first Sn plating layer 40a which is disposed on a surface of the first Ni plating layer 38a.

The second plating layer 30b includes a second Ni plating layer 38b and a second Sn plating layer 40b which is disposed on a surface of the second Ni plating layer 38b.

The Ni plating layers 38a, 38b cover the conductive resin layers 28a, 28b respectively thus obtaining solder barrier performance. By providing the Sn plating layers 40a, 40b on the surfaces of the Ni plating layers 38a, 38b respectively, the wettability for solder can be improved thus facilitating mounting of the multilayer ceramic capacitor.

It is preferable that a thickness per one layer of the first plating layer 30a at a center portion in a height direction of the first plating layer 30a disposed at the first end surface 12e and a thickness per one layer of the second plating layer 30b at a center portion in a height direction of the second plating layer 30b disposed at the second end surface 12f is set to a value which falls within a range of from about 1 µm to about 15 µm inclusive, for example.

Further, it is preferable that a thickness of the first plating layer 30a at a center portion in the length direction z of the first plating layer 30a disposed on the first main surface 12a, the second main surface 12b, the first side surface 12c and the second side surface 12d and a thickness of the second plating layer 30b at a center portion in the length direction z of the second plating layer 30b disposed on the first main surface 12a, the second main surface 12b, the first side surface 12c, and the second side surface 12d is set to a value which falls within a range of from about 1 µm to about 15 µm inclusive, for example.

A size in the length direction z of the multilayer ceramic capacitor 10 including the laminate body 12, the first external electrode 24a and the second external electrode 24b is denoted as a size L. A size in the laminating direction x of the multilayer ceramic capacitor 10 including the laminate body 12, the first external electrode 24a and the second external electrode 24b is denoted as a size T. A size in the width direction y of the multilayer ceramic capacitor 10 including the laminate body 12, the first external electrode 24a and the second external electrode 24b is denoted as a size W.

With respect to the sizes of the multilayer ceramic capacitor 10, for example, it is preferable that the size L in the length direction z is set to a value which falls within a range of from about 1.0 mm to about 5.6 mm inclusive, the size W in the width direction y is set to a value which falls within a range of from about 0.5 mm to about 5.1 mm inclusive, and the size T in the laminating direction x is set to a value which falls within a range of from about 0.5 mm to about 3.2 mm inclusive.

In the multilayer ceramic capacitor 10 shown in FIG. 1, the conductive resin layers 28a, 28b each include the first layer 32a, 32b disposed on the base electrode layer 26a, 26b, the second layer 34a, 34b disposed on the first layer 32a, 32b, and the third layer 36a, 36b disposed on the second layer 34a, 34b. In the first layers 32a, 32b and the third layers 36a, 36b, the porosity which is an area ratio of pores obtained from a binary image within a predetermined field of view is set to equal to or less than about 5%, and the porosity in the second layers 34a, 34b is set to equal to or more than about 6%, for example. Further, where the length of the first layer 32a, 32b which is brought into contact with portions of the first and second main surfaces 12a, 12b and the first and second side surfaces 12c, 12d is denoted as the size A, the length of the second layer 34a, 34b which is brought into contact with the first and second main surfaces 12a, 12b and portions of the first and second side surfaces 12c, 12d is denoted as the size B, and assuming the length of the third layer 36a, 36b which is brought into contact with portions of the first and second main surfaces 12a, 12b and portions of the first and second side surfaces 12c, 12d is denoted as the size C, a ratio of the size A, the size B and the size C satisfies a relationship of size A:size B:size C=about 15 or more and about 70 or less: about 10 or more and about 65 or less: about 10 or more and about 65 or less (here, a ratio of the size A+ a ratio of the size B+ a ratio of the size C=100). Accordingly, even when a substrate stress is applied to the printed circuit board on which the multilayer ceramic capacitor 10 is mounted, the progress destination of rupture cracks at the time of a deflection test can be selectively guided toward the conductive resin layer in a stable manner thus reducing or preventing the occurrence of the rupture cracks in the laminate body.

The above-mentioned mechanism is considered as follows.

That is, a coagulation force is reduced or prevented at a low level by increasing the porosity of the conductive resin layer of the second layer 34a, 34b. Accordingly, when a substrate stress is applied to the multilayer ceramic capacitor, by progressing cracks in the conductive resin layer of the second layer 34a, 34b before the laminate body 12 ruptures, it is possible to reduce or prevent the occurrence of rupture cracks in the laminate body 12. Further, due to the low porosity in the conductive resin layer of the second layer 34a, 34b and the presence of the conductive resin layer of the first layer 32a, 32b where a coagulation force is high, it is possible to prevent the progress of the rupture cracks which occurs in the conductive resin layer of the second layer 34a, 34b from being bent toward the laminate body 12 side (the progress of the cracks toward the laminate body). Further, due to the low porosity in the conductive resin layer of the second layer 34a, 34b and the presence of the conductive resin layer of the third layer 36a, 36b which can reduce or prevent the infiltration of moisture such as a plating liquid, it is possible to protect the conductive resin layer of the second layer 34a, 34b and to maintain in a stable manner a state where a substrate stress can be released during a rupture progress.

With respect to the conductive resin layers of the first layer 32a, 32b, the second layer 34a, 34b, and the third layer 36a, 36b, in the case where thicknesses of the conductive resin layers disposed on at least the first and second main surfaces 12a, 12b and the first and second side surfaces 12c, 12d are excessively small, it is difficult for the respective conductive resin layers to provide their functions described above. However, in the present preferred embodiment, the respective conductive resin layers have thicknesses with which conditions defined by the size A, the size B and the size C can be ensured. Accordingly, the respective conductive resin layers can provide their functions in a stable manner.

As a result, a fail-safe function against a substrate bending stress can be stabilized and thus, the multilayer ceramic capacitor 10 has both the mountability and the conductivity which the external electrode 24 of the multilayer ceramic capacitor 10 is required to have.

In the multilayer ceramic capacitor 10 shown in FIG. 1, when the porosity of the conductive resin layer of the second layer 34a, 34b is equal to or less than about 50%, a conduction path in the conductive resin layer 28 can be ensured and thus, it is possible to maintain a relatively low ESR.

Further, in the multilayer ceramic capacitor 10 shown in FIG. 1, when the base electrode layer 26 includes a glass component, the glass component defines and functions an adhesive agent between the laminate body 12 and the base electrode layer 26. Further, a space which is not filled with metal is filled with glass and thus, the glass component enables complete hermetic sealing of the base electrode layer 26 such that the humidity resistance is improved.

2. Method of Manufacturing Multilayer Ceramic Capacitor

Next, a non-limiting example of a method of manufacturing a multilayer ceramic capacitor which is a multilayer ceramic electronic component is described.

First, a laminate body including a first internal electrode layer and a second internal electrode layer is prepared.

Specifically, first, a ceramic paste including ceramic powder is applied by coating in a sheet shape using a screen printing method or the like, for example, and is dried thus preparing a ceramic green sheet.

Next, a conductive paste to form an internal electrode is applied by coating on the ceramic green sheet using a screen printing method or a gravure printing method in a predetermined pattern, for example. Accordingly, a ceramic green sheet on which an internal electrode forming conductive pattern is formed and a ceramic green sheet on which the internal electrode forming conductive pattern is not formed are prepared. The ceramic paste and the internal electrode forming conductive paste include a binder and a solvent, for example. However, a known organic binder and a known organic solvent may be also used.

Sequentially, a predetermined number of outer-layer ceramic green sheets on which the internal electrode forming conductive pattern is not formed are laminated, and the ceramic green sheets on each of which the internal electrode forming conductive pattern is formed are sequentially laminated to the laminated outer-layer ceramic green sheets. Then, a predetermined number of ceramic green sheets on which the internal electrode forming conductive pattern is not formed are laminated so that a mother laminate body is prepared.

The respective green sheets in the mother laminate body may be bonded to each other, for example, by compression bonding in a laminating direction by a hydrostatic press or the like, for example, when necessary.

Then, the mother laminate body is cut into pieces each having a predetermined shape and a predetermined size so that raw laminate chips are cut out from the mother laminate body. Then, corner portions and ridge portions of the laminate bodies may be rounded by applying barrel polishing to the raw laminate chips.

Subsequently, each raw laminate chip cut out from the mother laminate body is fired so that the laminate body is formed. In the laminate body, first internal electrode layers and second internal electrode layers are disposed. The first internal electrode layers are led out to the first end surface, and the second internal electrode layers are lead out to the second end surface. It is preferable that a firing temperature for firing the raw laminate chip is set to a value which falls within a range of from about 900° C. to about 1300° C. inclusive, for example. However, the firing temperature depends on a ceramic material and a material for forming an internal electrode forming conductive paste.

Next, the base electrode layer is formed. First, an external electrode forming conductive paste is applied by coating to both end surfaces of the laminate chip after being fired and the paste is baked thus forming a first base electrode layer of the first external electrode and a second base electrode layer of the second external electrode. It is preferable that a baking temperature is set to a value which falls within a range of from about 700° C. to about 900° C. inclusive, for example.

Then, a conductive resin paste including a thermosetting resin and a metal component is applied by coating so as to cover a surface of the base electrode layer formed of the fired layer. A heat treatment is preferably performed at a temperature of about 180° C. to about 550° C. inclusive, for example, so as to cure the resin thus forming the conductive resin layer. It is preferable that an atmosphere during such a heat treatment is an $N_2$ atmosphere, for example. To prevent scattering of the resin and to prevent oxidization of the various kinds of metal components, it is preferable that an oxygen concentration is set to equal to or less than about 100 ppm, for example.

More specifically, a conductive resin paste for forming a first layer of the conductive resin layer is applied by coating to the base electrode layer, and a heat treatment is performed at a temperature of about 180° C. to about 550° C. inclusive, for example, so as to thermally set the resin to form the conductive resin layer which forms the first layer. Then, a conductive resin paste for forming the second layer is applied by coating to the conductive resin layer which forms the first layer, and a heat treatment is performed at a temperature of about 180° C. to about 550° C. inclusive, for example, so as to cure the resin to form the conductive resin layer which forms the second layer. Then, a conductive resin paste for forming the third layer is applied by coating to the conductive resin layer which forms the second layer, and a heat treatment is performed at a temperature of about 180° C. to about 550° C. inclusive, for example, so as to cure the resin to form the conductive resin layer which forms the third layer.

As a coating method of forming the respective conductive resin layers of the first layer, the second layer, and the third layer by coating, for example, a dip coating method, a screen coating method, or a roller coating method can be used.

The porosities of the respective layers, that is, the first layer, the second layer, and the third layer which respectively form the conductive resin layers can be adjusted by an amount of metal powder (PVC) and an amount of an additive respectively included in the conductive resin pastes for forming the respective layers, and a temperature at the time of performing curing the respective conductive resin layers of the respective layers.

Further, where the length of the first layer which is brought into contact with portions of the first and second main surfaces and portions of the first and second side surfaces is denoted as the size A, the length of the second layer which is brought into contact with portions of the first and second main surfaces and portions of the first and second side surfaces is denoted as the size B, and the length of the third layer which is brought into contact with portions of the first and second main surfaces and portions of the first and second side surfaces is denoted as the size C, a ratio of the respective sizes indicated by the size A:the size B:the size C can be controlled by adjusting the clearance of a blade during dip coating, a protrusion amount of the laminate body into a paste, and the viscosity of the paste when the conductive resin paste is applied by coating using the dip coating method. As a result, by controlling a wetting amount of a conductive resin paste to the first main surface, the second main surface, the first side surface, and the second side surface of the laminate body, a target ratio can be obtained.

Then, the plating layer is formed on the conductive resin layer. The plating layer is formed by electrolytic plating, electroless plating or the like, for example.

The multilayer ceramic capacitor 10 shown in FIG. 1 can be manufactured as described above.

3. Test Example

Next, to confirm advantageous effects of the above-mentioned multilayer ceramic electronic component according to a preferred embodiment of the present invention, multilayer ceramic capacitors were manufactured as the multilayer ceramic electronic components, and specimens where porosities and size ratios of the respective layers which form the conductive resin layers differ from each other were prepared. The specimens were subjected to a substrate bending test. The number of coagulation ruptures in the second layer where the coagulation rupture occurs, and the number of times of occurrence of deflection cracks on the laminate body were confirmed. Further, with respect to some specimens, ESR of the specimens after the substrate bending test were measured, and reliability of the multilayer ceramic capacitor was confirmed.

(1) Specification of Specimen in the Test Example

First, to prepare specimens 1 to 23, multilayer ceramic capacitors having the following specifications were prepared in accordance with the manufacturing method of the above-mentioned multilayer ceramic electronic component.
size of multilayer ceramic capacitor: L×W×T (including design values): about 3.2 mm× about 1.6 mm× about 1.6 mm
material of ceramic layer: $BaTiO_3$
capacitance: about 1 μF
rated voltage: about 50 V
structural base electrode layer of external electrode:
electrode including conductive metal (Cu) and glass component film thickness at end surface: approximately 80 μm conductive resin layers of first layer, second layer, and third layer: metal filler; Cu coated by Ag
resin: epoxy-based resin
thermosetting temperature: about 200° C.
thicknesses of first and second conductive resin layers at center portions in height direction of the first and second base electrode layers disposed at the first end surface and the second end surface: about 80 μm
thicknesses of first and second conductive resin layers at center portions in length direction of the first and second base electrode layers disposed on the first main surface, the second main surface and the first side surface and the second side surface: about 30 μm
See Table 1 to Table 6 with respect to the porosities of the respective layers, that is, the first layer, the second layer and the third layer in the specimens belonging to the respective specimen numbers.
See Table 1 to Table 6 with respect to the size ratios of the respective layers, that is, the first layer, the second layer and the third layer in the specimens belonging to the respective specimen numbers.
plating layer: double layered structure consisting of Ni plating layer (thickness: about 3 μm) and Sn plating layer (thickness: about 4 μm)

In preparing the specimens belonging to specimen No. 1 to No. 23, in the step of forming the conductive resin layer, the respective conductive resin layers which form the first layer, the second layer, and the third layer were formed using a dipping method.

The porosities of the respective conductive resin layers as the first layer, the second layer, and the third layer were controlled by adjusting an amount of metal powder (PVC).

The respective size ratios of the size A:the size B the size C in the respective conductive resin layers of the first layer, the second layer and the third layer were controlled by adjusting the clearances of blades.

(2) Respective Measuring Methods (a) Porosity Calculation Method

Polishing was applied to either the first side surface or the second side surface of the multilayer ceramic capacitor which is a specimen along the first side surface or the second side surface, and the polishing was performed by an amount of a length which is about half of a length in a direction that the first side surface 12c and the second side surface 12d are vertically connected to each other (about ½ W). Then, in the polished cross section, with respect to the conductive resin layers on the first main surface and the second main surface, pictures of the conductive resin layers are taken by using a scanning electron microscope (SEM) thus acquiring images of the conductive resin layers while defining a range of the microscope such that the whole field of view of about 50 μm× about 20 μm is occupied by the conductive resin layers.

Then, using software which can binarize an image, a range where the image is binarized adjusted such that pores and portions other than the pores are clearly distinguished from each other thus obtaining a result of image binarization, and porosities of the first layer, the second layer, and the third layer were calculated from values of the binarization result of the respective layers as the first layer, the second layer and the third layer.

(b) Method of Measuring Size Ratios of Respective Layers of Conductive Resin Layers Polishing was applied to either the first side surface or the second side surface of the multilayer ceramic capacitor which is a specimen along the first side surface or the second side surface, and the polishing was performed by an amount of a length which is about half of a length in a direction that the first side surface and the second side surface are vertically connected to each other (about ½ W). Then, in the polished cross section, a size of the first layer of the conductive resin layer which is brought into contact with the first main surface and the second main surface in the length direction z along which the first end surface and the second end surface are connected to each other is measured and set as the size A, a size of the second layer of the conductive resin layer which is brought into contact with the first main surface and the second main surface in the length direction z along which the first end surface and the second end surface are connected to each other is measured and set as the size B, and a size of the third layer of the conductive resin layer which is brought into contact with the first main surface and the second main surface in the length direction z along which the first end surface and the second end surface are connected to each other is measured and set as the size C. Then, the sum of the size A, the size B, and the size C is defined as 100, and size ratios of the respective layers were calculated.

(3) Test and Evaluation Method (a) Substrate Bending Test

First, the multilayer ceramic capacitor prepared as a specimen was mounted on a base substrate having a thickness of about 1.6 mm using a solder paste. Then, a substrate bending test was performed such that a mechanical stress was applied to the surface of the substrate on a side where the multilayer ceramic capacitor was not mounted, by bending the substrate using a pressing rod having a diameter of about 1 mm. Then, a holding time was set to about five seconds, and a bending amount was set to about 5 mm, and the number of specimens was set to thirty with respect to each specimen. After the substrate bending test was finished, the multilayer ceramic capacitor was removed from the substrate, and the presence or the non-presence of coagulation rupture was confirmed by a method described hereinafter.

(b) Method of Confirming Cracks on Laminate Body and Coagulation Rupture of Second Layer after Substrate was Bent After the substrate bending test was finished, solder was melted by using a hot plate, the multilayer ceramic capacitor was removed from the substrate, and resin embedding was performed in a state where the multilayer ceramic capacitor was inclined by about 90 degrees from a mounted state. Then, polishing was applied to either the first main surface and second main surface, or the first side surface and second side surface of the multilayer ceramic capacitor along the first side surface or the second side surface, and the polishing was performed by an amount of a length which is about half of a length in a direction that the first side surface and the second side surface are vertically connected to each other (about ½ W). Then, in the polished cross section, the multilayer ceramic capacitor was observed using a microscope having a magnification of at least 10 times or more, and the number of specimens where cracks occurred in the laminate body and the number of specimens where rupture progress occurred in the conductive resin layer of the second layer were counted.

With respect to the counting of the number of specimens where the rupture progress occurred, the rupture progress was confirmed with respect to both external electrodes, that is, the first external electrode and the second external electrode of one multilayer ceramic capacitor.

(c) Method of Measuring ESR

The multilayer ceramic capacitor of the specimen was mounted on the substrate using a solder paste, and the ESR (Equivalent Series Resistance) was measured using a network analyzer (manufactured by Keysight corporation: E5061B) under a condition where a measurement frequency was set to about 10 MHz.

The evaluation results are shown in Table 1 to Table 6. Table 1 shows the results obtained by changing the porosity of the first layer, Table 2 shows the results obtained by changing the porosity of the second layer, and Table 3 shows the results obtained by changing the porosity of the third layer. Further, Table 4 shows the results obtained by changing the ratio of the size A of the first layer, Table 5 shows the results obtained by changing the size B of the second layer, and Table 6 shows the results obtained by changing the size C of the third layer. In respective tables, the specimens belonging to the specimen number marked with * fall outside the scope of the present invention.

TABLE 1

|  |  | First layer | Second layer | Third layer | Number of occurrence of rupture progress to second layer (pieces) | Number of occurrence of cracks in laminated body (pieces) |
|---|---|---|---|---|---|---|
| Specimen 1 | Porosity (%) | 0 | 24 | 1 | 12/60 | 0/30 |
|  | Size ratio | 39 | 40 | 21 |  |  |
| Specimen 2 | Porosity (%) | 2 | 24 | 2 | 9/60 | 0/30 |
|  | Size ratio | 40 | 40 | 20 |  |  |
| Specimen 3 | Porosity (%) | 5 | 24 | 0 | 20/60 | 0/30 |
|  | Size ratio | 41 | 41 | 18 |  |  |
| * Specimen 4 | Porosity (%) | 13 | 24 | 2 | 23/60 | 2/30 |
|  | Size ratio | 40 | 39 | 21 |  |  |

TABLE 2

|  |  | First layer | Second layer | Third layer | Number of occurrence of rupture progress to second layer (pieces) | Number of occurrence of cracks in laminated body (pieces) | ESR(mΩ) |
|---|---|---|---|---|---|---|---|
| * Specimen 5 | Porosity (%) | 2 | 0 | 0 | 0/60 | 1/30 | 83 |
|  | Size ratio | 40 | 40 | 20 |  |  |  |
| Specimen 6 | Porosity (%) | 0 | 6 | 1 | 1/60 | 0/30 | 82 |
|  | Size ratio | 41 | 41 | 18 |  |  |  |
| Specimen 2 | Porosity (%) | 2 | 24 | 2 | 9/60 | 0/30 | 84 |
|  | Size ratio | 40 | 40 | 20 |  |  |  |
| Specimen 7 | Porosity (%) | 1 | 50 | 0 | 55/60 | 0/30 | 83 |
|  | Size ratio | 45 | 34 | 21 |  |  |  |
| Specimen 8 | Porosity (%) | 0 | 72 | 1 | 60/60 | 0/30 | 230 |
|  | Size ratio | 42 | 29 | 19 |  |  |  |

TABLE 3

|  |  | First layer | Second layer | Third layer | Number of occurrence of rupture progress to second layer (pieces) | Number of occurrence of cracks in laminated body (pieces) |
|---|---|---|---|---|---|---|
| Specimen 9 | Porosity (%) | 1 | 21 | 0 | 12/60 | 0/30 |
|  | Size ratio | 40 | 39 | 21 |  |  |
| Specimen 2 | Porosity (%) | 2 | 24 | 2 | 9/60 | 0/30 |
|  | Size ratio | 40 | 40 | 20 |  |  |
| Specimen 10 | Porosity (%) | 0 | 24 | 5 | 10/60 | 0/30 |
|  | Size ratio | 40 | 40 | 20 |  |  |
| * Specimen 11 | Porosity (%) | 2 | 29 | 10 | 0/60 | 3/30 |
|  | Size ratio | 41 | 39 | 20 |  |  |

TABLE 4

|  |  | First layer | Second layer | Third layer | Number of occurrence of rupture progress to second layer (pieces) | Number of occurrence of cracks in laminated body (pieces) |
|---|---|---|---|---|---|---|
| * Specimen 12 | Porosity (%) | 0 | 24 | 1 | 12/60 | 1/30 |
|  | Size ratio | 4 | 58 | 38 |  |  |
| Specimen 13 | Porosity (%) | 1 | 24 | 1 | 6/60 | 0/30 |
|  | Size ratio | 15 | 37 | 48 |  |  |
| Specimen 2 | Porosity (%) | 2 | 24 | 2 | 9/60 | 0/30 |
|  | Size ratio | 40 | 40 | 20 |  |  |
| Specimen 14 | Porosity (%) | 4 | 24 | 1 | 3/60 | 0/30 |
|  | Size ratio | 70 | 16 | 14 |  |  |
| * Specimen 15 | Porosity (%) | 1 | 24 | 1 | 0/60 | 2/30 |
|  | Size ratio | 90 | 6 | 4 |  |  |

TABLE 5

|  |  | First layer | Second layer | Third layer | Number of occurrence of rupture progress to second layer (pieces) | Number of occurrence of cracks in laminated body (pieces) |
|---|---|---|---|---|---|---|
| * Specimen 16 | Porosity (%) | 3 | 24 | 2 | 0/60 | 5/30 |
|  | Size ratio | 37 | 5 | 58 |  |  |
| Specimen 17 | Porosity (%) | 1 | 24 | 1 | 2/60 | 0/30 |
|  | Size ratio | 54 | 10 | 36 |  |  |
| Specimen 2 | Porosity (%) | 2 | 24 | 2 | 9/60 | 0/30 |
|  | Size ratio | 40 | 40 | 20 |  |  |
| Specimen 18 | Porosity (%) | 0 | 24 | 0 | 28/60 | 0/30 |
|  | Size ratio | 18 | 65 | 17 |  |  |
| * Specimen 19 | Porosity (%) | 1 | 24 | 0 | 0/60 | 2/30 |
|  | Size ratio | 12 | 82 | 6 |  |  |

TABLE 6

|  |  | First layer | Second layer | Third layer | Number of occurrence of rupture progress to second layer (pieces) | Number of occurrence of cracks in laminated body (pieces) |
|---|---|---|---|---|---|---|
| * Specimen 20 | Porosity (%) | 3 | 24 | 1 | 0/60 | 2/30 |
|  | Size ratio | 36 | 61 | 3 |  |  |
| Specimen 21 | Porosity (%) | 2 | 23 | 1 | 4/60 | 0/30 |
|  | Size ratio | 46 | 44 | 10 |  |  |
| Specimen 2 | Porosity (%) | 2 | 24 | 2 | 9/60 | 0/30 |
|  | Size ratio | 40 | 40 | 20 |  |  |
| Specimen 22 | Porosity (%) | 3 | 24 | 0 | 6/60 | 0/30 |
|  | Size ratio | 22 | 13 | 65 |  |  |
| * Specimen 23 | Porosity (%) | 1 | 21 | 1 | 0/60 | 3/30 |
|  | Size ratio | 13 | 7 | 80 |  |  |

(3) Test Results

Table 1 to Table 3 show the test results obtained by changing the porosities of the respective layers of the first layer, the second layer, and the third layer. Specimens belonging to all of specimens No. 1 to No. 11 shown in Table 1 to Table 3 satisfied the condition that the size A:the size B:the size C is set to about 15 to about 70 inclusive: about 10 to about 65 inclusive: about 10 to about 65 inclusive (the ratio of the size A+ the ratio of the size B+ the ratio of the size C=100).

First, as shown in Table 1, in all of the specimens belonging to the specimen No. 1, the specimen No. 2, and the specimen No. 3, the porosity of the conductive resin layer of the first layer was equal to or less than about 5%, the porosity of the conductive resin layer of the second layer was equal to or more than about 6%, and the porosity of the conductive resin layer of the third layer was equal to or less than about 5%. Accordingly, in the specimens belonging to all these specimen Nos., the specimens where the rupture progressed to the conductive resin layer of the second layer were present. However, a fail-safe function was provided and thus, no cracks were confirmed in all of the laminate bodies. That is, no cracks occurred in 30 specimens.

On the other hand, in the specimens belonging to the specimen No. 4, the porosity of the conductive resin layer of the first layer was about 13%, that is, the porosity exceeded about 5% and thus, cracks occurred in the laminate body. That is, cracks occurred in two specimens among the thirty specimens.

Next, as shown in Table 2, in all of the specimens belonging to the specimen No. 6, the specimen No. 2, the specimen No. 7, and the specimen No. 8, the porosity of the conductive resin layer of the second layer was equal to or more than about 6%, the porosity of the conductive resin layer of the first layer was equal to or less than about 5%, and the porosity of the conductive resin layer of the third layer was equal to or less than about 5%. Accordingly, in the specimens belonging to all of these specimen Nos., the rupture progress to the conductive resin layer of the second layer was present. However, due to the fail-safe function, no cracks were confirmed in the laminate body in the thirty specimens.

On the other hand, in the specimens belonging to specimen No. 5, the porosity of the conductive resin layer of the second layer was about 0%, that is, the porosity was less than about 6% and thus, cracks occurred in the laminate body in one specimen among the thirty specimens.

As the results of the measurement of ESR, in the specimens belonging to specimen No. 8, the porosity of the conductive resin layer of the second layer was about 72% so that the porosity exceeded about 50% and thus, a conductive path became discontinuous due to the high porosity and the conductivity of the conductive resin layer was lowered. Accordingly, the result was obtained where ESR of the specimens belonging to specimen No. 8 was about 230 mΩ which is higher than ESR of other specimens.

As shown in Table 3, in all of the specimens belonging to the specimen No. 9, the specimen No. 2 and the specimen No. 10, the porosity of the conductive resin layer of the third layer was equal to or less than about 5%, the porosity of the conductive resin layer of the first layer was equal to or less than about 5%, and the porosity of the conductive resin layer of the second layer was equal to or more than about 6%. In specimens belonging to all of these specimen Nos., the rupture progress to the conductive resin layer of the second layer was present. However, due to the fail-safe function, no cracks were confirmed in the laminate body in the thirty specimens.

On the other hand, in the specimens belonging to the specimen No. 11, the porosity of the conductive resin layer of the third layer was about 10%, that is, the porosity exceeds about 5%. Accordingly, cracks occurred in the laminate body in three specimens among the thirty specimens.

Next, Table 4 to Table 6 show test results in the case where the size A, the size B, and the size C are changed. In all of the specimens belonging to the specimen No. 2 and the specimen No. 12 to specimen No. 23 shown in Table 4 to Table 6, the porosity of the first layer and the porosity of the third layer were equal to or less than about 5%, and the porosity of the second layer were equal to or more than about 6%.

As shown in Table 4, in all specimens belonging to the specimen No. 13, the specimen No. 2 and the specimen No. 14, the ratio of the size A was set to a value which falls within a range of from about 15 to about 70 inclusive, the ratio of the size B was set to a value which falls within a range of from about 10 to about 65 inclusive, and the ratio of the size C was set to a value which falls within a range of from about 10 to about 65 inclusive. Accordingly, in specimens belonging to all of these specimen Nos., the rupture progress to the conductive resin layer of the second layer was present. However, due to a fail-safe function, no cracks were confirmed in the laminate body in the thirty specimens.

On the other hand, in the specimens belonging to the specimen No. 12, the ratio of the size A was set to about 4, that is, the ratio of the size A was smaller than about 15 and thus, cracks occurred in the laminate body at a rate of one specimen out of thirty specimens. In the specimens belonging to the specimen No. 15, the ratio of the size A was set to about 90, that is, the ratio of the size A exceeded about 70 and thus, cracks occurred in two specimens among the thirty specimens.

Next, as shown in Table 5, in all of the specimens belonging to the specimen No. 17, the specimen No. 2, and the specimen No. 18, the ratio of the size B was set to a value which falls within a range of from about 10 to about 65 inclusive, the ratio of the size A was set to a value which falls within a range of from about 15 to about 0 inclusive, and the ratio of the size C was set to a value which falls within a range of from about 10 to about 65 inclusive. Accordingly, in specimens belonging to all of these specimen Nos., the rupture progress to the conductive resin layer of the second layer was present. However, due to the fail-safe function, no cracks were confirmed in the laminate body in the thirty specimens.

On the other hand, with respect to the specimens belonging to specimen No. 16, the ratio of the size B was set to about 5, that is, the ratio of the size B was smaller than about 10. Accordingly, cracks occurred in the laminate body in five specimens among the thirty specimens. On the other hand, in specimens belonging to the specimen No. 19, at least the ratio of the size B was set to about 82, that is, the ratio of the size B exceeded about 65. Accordingly, cracks occurred in the laminate body in two specimens among the thirty specimens.

As shown in Table 6, in all of the specimens belonging to the specimen No. 21, the specimen No. 2, and the specimen No. 22, the ratio of the size C was set to a value which falls within a range of from about 10 to about 65 inclusive, the ratio of the size A was set to a value which falls within a range of from about 15 to about 70 inclusive, and the ratio of the size B was set to a value which falls within a range of from about 10 to about 65 inclusive. Accordingly, in the specimens belonging to all these specimen Nos., the rupture progress to the conductive resin layer of the second layer was present. However, due to the fail-safe function, cracks on the laminate body were not confirmed in the thirty specimens.

On the other hand, with respect to the specimens belonging to specimen No. 20, the ratio of the size C was set to about 3, that is, the ratio of the size C is smaller than about 10. Accordingly, cracks occurred in the laminate body in two specimens among the thirty specimens. With respect to the specimens belonging to the specimen No. 23, at least the ratio of the size C was set to about 80, that is, the ratio of the size C exceeded about 65. Accordingly, cracks occurred in the laminate body in three specimens among the thirty specimens.

From the above-described results, in the multilayer ceramic electronic component, the conductive resin layer of the multilayer ceramic electronic component includes the first layer disposed on the base electrode layer, the second layer disposed on the first layer, and the third layer disposed on the second layer, and with respect to the first layer and the third layer, the porosity which is an area ratio of pores obtained from a binary image within a predetermined field of view is set to equal to or less than about 5%, the porosity in the second layer is set to equal to or more than about 6% and, further, where the length of the first layer which is brought into contact with portions of the first and second main surfaces and portions of the first and second side surfaces is denoted as the size A, the length of the second layer which is brought into contact with the portions of the first and second main surfaces and portions of the first and second side surfaces is denoted as the size B, and the length of the third layer which is brought into contact with portions of the first and second main surfaces and portions of the first and second side surfaces is denoted as the size C, a ratio of the size A, a ratio of the size B and a ratio of the size C satisfy the relationship of size A:size B:size C=about 15 or more and about 70 or less: about 10 or more and about 65 or less: about 10 or more and about 65 or less (wherein, the ratio of the size A+ the ratio of the size B+ the ratio of the size C=100). Accordingly, it was confirmed that even when a substrate stress is applied to the printed circuit board on which the multilayer ceramic electronic component is mounted, the progress destination of rupture cracks at the time of the deflection test can be selectively guided toward the conductive resin layer in a stable manner thus reducing or preventing the occurrence of the rupture cracks in the laminate body. As a result, a fail-safe function against a substrate bending stress can be stabilized and thus, it becomes apparent that the multilayer ceramic electronic components according to preferred embodiments of the present invention can achieve both the mountability and the conductivity which the external electrode of the multilayer ceramic electronic component is originally required to have.

Although preferred embodiments of the present invention have been disclosed as described above, the present invention is not limited to the above-described preferred embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a laminate body including:
- a plurality of ceramic layers which are laminated;
- a plurality of internal electrode layers which are laminated;
- a first main surface and a second main surface which face each other in a laminating direction;
- a first side surface and a second side surface which face each other in a width direction orthogonal or substantially orthogonal to the laminating direction; and
- a first end surface and a second end surface which face each other in a length direction orthogonal or substantially orthogonal to the laminating direction and the width direction; wherein
- the plurality of internal electrode layers include a first internal electrode layer which is exposed on the first end surface, and a second internal electrode layer which is exposed on the second end surface;
a first external electrode which is connected to the first internal electrode layers and is disposed on the first end surface, portions of the first and second main surfaces, and portions of the first and second side surfaces; and
a second external electrode which is connected to the second internal electrode layer and is disposed on the second end surface, portions of the first and second main surfaces, and portions of the first and second side surfaces; wherein
the first external electrode and the second external electrode each include:
- a base electrode layer including metal;
- a conductive resin layer which is disposed on the base electrode layer and includes a thermosetting resin and a metal component; and
- a plating layer which is disposed on the conductive resin layer;
the conductive resin layer includes:
- a first layer disposed on the base electrode layer;
- a second layer disposed on the first layer; and
- a third layer disposed on the second layer;
the first layer and the third layer have a porosity of equal to or less than about 5% and the second layer has the porosity equal to or more than about 6%, where porosity is defined as an area ratio of pores obtained from a binary image within a predetermined field of view; and
a ratio of a size A, a ratio of a size B, and a ratio of a size C satisfy a relationship of the size A:the size B:the size C=about 15 or more and about 70 or less: about 10 or more and about 65 or less: about 10 or more and about 65 or less, where
the ratio of the size A+ the ratio of the size B+ the ratio of the size C=100,
a length of the first layer which is brought into contact with portions of the first and second main surfaces and the first and second side surfaces is denoted as the size A,
a length of the second layer which is brought into contact with the first and second main surfaces and portions of the first and second side surfaces is denoted as the size B, and
a length of the third layer which is brought into contact with the portions of the first and second main surfaces and the portions of the first and second side surfaces is denoted as the size C.

2. The multilayer ceramic electronic component according to claim 1, wherein the porosity is equal to or less than about 50%.

3. The multilayer ceramic electronic component according to claim 1, wherein the base electrode layer includes a glass component.

4. The multilayer ceramic electronic component according to claim 1, wherein a number of the plurality of ceramic layers is 15 or more and 200 or less.

5. The multilayer ceramic electronic component according to claim 1, wherein
the laminated body includes an external layer portion including at least two of the plurality of ceramic layers and an internal layer portion including at least one of the plurality of ceramic layers and the plurality of internal electrode layers disposed thereon; and
the external layer portion is located on a side of the first main surface and a side of the second main surface of the laminated body.

6. The multilayer ceramic electronic component according to claim 5, wherein a thickness of the external layer portion is about 10 μm or more and about 300 μm or less.

7. The multilayer ceramic electronic component according to claim 1, wherein the laminated body has a dimension in the length direction of about 0.90 mm or more and about 5.40 mm or less, a dimension in the width direction of about 0.40 mm or more and about 4.92 mm or less, and a dimension in the lamination direction of about 0.40 mm or more and about 2.96 mm or less.

8. The multilayer ceramic electronic component according to claim 1, wherein the plurality of ceramic layers are made of a dielectric material.

9. The multilayer ceramic electronic component according to claim 8, wherein the dielectric material includes at least one of $BaTiO_3$, $CaTiO_3$, $SrTiO_3$, and $CaZrO_3$ as a main component.

10. The multilayer ceramic electronic component according to claim 1, wherein a thickness of each of the plurality of ceramic layers is about 0.5 μm or more and about 20.0 μm or less.

11. The multilayer ceramic electronic component according to claim 1, wherein the first internal electrode layer includes a first counter electrode portion facing the second internal electrode layer, and a first extended electrode portion located at one end of the first internal electrode layer and extended from the first counter electrode portion to the first end surface of the laminated body.

12. The multilayer ceramic electronic component according to claim 1, wherein the second internal electrode layer includes a second counter electrode portion facing the first internal electrode layer, and a second extended electrode portion located at one end of the second internal electrode layer and extended from the second counter electrode portion to the second end surface of the laminated body.

13. The multilayer ceramic electronic component according to claim 11, wherein the first counter electrode portion and the first extended electrode portion have a same or substantially a same width.

14. The multilayer ceramic electronic component according to claim 12, wherein the second counter electrode portion and the second extended electrode portion have a same or substantially a same width.

15. The multilayer ceramic electronic component according to claim 1, wherein the plurality of internal electrode layers include an alloy including at least one of Ni, Cu, Ag, Pd, and Au.

16. The multilayer ceramic electronic component according to claim 1, wherein each of the plurality of internal electrode layers has a thickness of about 0.2 μm or more and about 2.0 μm or less.

17. The multilayer ceramic electronic component according to claim 1, wherein a number of the plurality of internal electrode layers is 15 or more and 200 or less.

18. The multilayer ceramic electronic component according to claim 1, wherein the base electrode layer includes at least one of a baked layer, a plating layer, and a thin film layer.

* * * * *